United States Patent
Asahina et al.

(10) Patent No.: US 8,940,853 B2
(45) Date of Patent: Jan. 27, 2015

(54) CATIONIC BLOCKED POLYISOCYANATE AND AQUEOUS COMPOSITION COMPRISING THE SAME

(75) Inventors: Yoshiyuki Asahina, Tokyo (JP); Michiaki Sasahira, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 151 days.

(21) Appl. No.: 13/049,085

(22) Filed: Mar. 16, 2011

(65) Prior Publication Data

US 2012/0238697 A1 Sep. 20, 2012

(51) Int. Cl.
| | |
|---|---|
| C08G 18/10 | (2006.01) |
| C08G 18/32 | (2006.01) |
| C08G 18/48 | (2006.01) |
| C08G 18/73 | (2006.01) |
| C08G 18/79 | (2006.01) |
| C08G 18/80 | (2006.01) |
| C08G 18/08 | (2006.01) |
| C08G 18/28 | (2006.01) |
| C09D 175/06 | (2006.01) |
| C09D 175/08 | (2006.01) |

(52) U.S. Cl.
CPC ........ *C08G 18/3221* (2013.01); *C08G 18/4829* (2013.01); *C08G 18/73* (2013.01); *C08G 18/792* (2013.01); *C08G 18/8025* (2013.01); *C08G 18/807* (2013.01); *C08G 18/0833* (2013.01); *C08G 18/10* (2013.01); *C08G 18/2875* (2013.01); *C09D 175/06* (2013.01); *C09D 175/08* (2013.01)
USPC .................. 528/54; 528/45; 528/48; 528/49; 528/52

(58) Field of Classification Search
USPC .......... 528/45, 48, 49, 52, 54; 560/24, 25, 26, 560/115, 157, 158; 252/182.2, 182.21, 252/182.22; 524/591, 839, 840
See application file for complete search history.

(56) References Cited

U.S. PATENT DOCUMENTS

| | | | | |
|---|---|---|---|---|
| 4,294,940 | A * | 10/1981 | Hino et al. | 525/124 |
| 4,433,017 | A * | 2/1984 | Goto et al. | 528/45 |
| 4,931,524 | A * | 6/1990 | Sato et al. | 527/301 |
| 5,723,536 | A | 3/1998 | Baumbach et al. | |
| 6,063,860 | A | 5/2000 | Rimmer et al. | |
| 6,111,048 | A * | 8/2000 | Asahina et al. | 528/45 |
| 6,187,860 | B1 | 2/2001 | Konig et al. | |
| 6,437,077 | B1 | 8/2002 | Danner | |
| 6,521,700 | B1 * | 2/2003 | Dworak et al. | 524/589 |
| 7,220,814 | B2 * | 5/2007 | Rische et al. | 528/45 |
| 7,691,941 | B2 * | 4/2010 | Dorr et al. | 524/591 |
| 2002/0055602 | A1 * | 5/2002 | Gerle et al. | 528/45 |
| 2010/0256324 | A1 | 10/2010 | Asahina et al. | |
| 2011/0027585 | A1 * | 2/2011 | Pritschins et al. | 428/375 |

FOREIGN PATENT DOCUMENTS

| | | |
|---|---|---|
| JP | 10-45866 | 2/1998 |
| JP | 11-512772 | 11/1999 |
| JP | 2000-26570 | 1/2000 |
| JP | 2002-511507 | 4/2002 |
| JP | 2007-254598 | 10/2007 |
| WO | 97/31961 | 9/1997 |
| WO | 2009/075358 | 6/2009 |
| WO | WO 2009103381 A1 * | 8/2009 ............. C08G 18/28 |

OTHER PUBLICATIONS

English language Abstract for WO 99/52961, corresponding to JP 2002-511507, Apr. 16, 2002.
English language Abstract for WO 97/12924, corresponding to JP 11-512772, Nov. 2, 1999.

* cited by examiner

*Primary Examiner* — Michael L Leonard
(74) *Attorney, Agent, or Firm* — Greenblum & Bernstein, P.L.C.

(57) ABSTRACT

Blocked polyisocyanates, obtained by using a polyisocyanate derived from an aliphatic and/or an alicyclic diisocyanate monomer, as a precursor, and including both of a blocked isocyanate group blocked with a pyrazole compound and a cationic group neutralized with an anion, in one molecule thereof; methods for making and using such blocked polyisocyanates; and compositions of matter including such blocked polyisocyanates.

13 Claims, No Drawings

CATIONIC BLOCKED POLYISOCYANATE AND AQUEOUS COMPOSITION COMPRISING THE SAME

TECHNICAL FIELD

The present invention relates to a cationic blocked polyisocyanate, and an aqueous composition comprising the same.

BACKGROUND ART

The blocked polyisocyanate is a polyisocyanate whose isocyanate group has been blocked with a blocking agent. Although the blocked polyisocyanate is a stable compound at normal temperature, the blocking agent dissociates by heating to regenerate isocyanate groups. The isocyanate group is highly reactive, and reacts with a so-called active hydrogen. By utilizing this function, the blocked polyisocyanate is applied to various uses such as coatings, adhesives, sealants and surface treating agents.

The reduction of the discharge of global environmental burden substances has recently become an important subject. Attempts to make blocked polyisocyanates into aqueous compositions have therefore been made. Additionally, melamine compounds, which are compounds applicable to aqueous compositions, have apprehension of generating formalin; and expectations of blocked polyisocyanates have been more raised (Patent Document 1).

However, although a blocked polyisocyanate, particularly a blocked polyisocyanate obtained by using as a precursor a polyisocyanate derived from an aliphatic diisocyanate monomer, is excellent in yellowing resistance, the blocked polyisocyanate needs to be baked at a high temperature. Although some technologies are disclosed for this technical problem (Patent Documents 2, 3 and 4), further improvements in low-temperature curability are demanded.

In order to self-disperse and solubilize a blocked polyisocyanate in water, the blocked polyisocyanate needs to be imparted with a hydrophilic group. However, conventional technologies have some problems. For example, in the case where a nonionic hydrophilic group is imparted, the hydrophilic group remains in a substrate even after heating, and the water resistance decreases in many cases. In the case of an ionic hydrophilic group, a neutralizing substance volatilizes from a substrate during heating. Due to the volatilization, the hydrophilicity of the ionic hydrophilic group decreases. The water resistance and the like are therefore excellent as compared with those of the nonionic hydrophilic group. An anionic hydrophilic group as one of the ionic groups is neutralized with a cationic compound containing a hydroxyl group in many cases. The storage stability of a blocked polyisocyanate having an anionic hydrophilic group thus neutralized, in an aqueous solution, is insufficient.

PRIOR ART DOCUMENTS

Patent Document

[Patent Document 1] JP 2007-254598 A
[Patent Document 2] JP 11-512772 A
[Patent Document 3] JP 2000-26570 A
[Patent Document 4] JP 2002-511507 A

DISCLOSURE OF THE INVENTION

Technical Problem

It is an object of the present invention to provide a blocked polyisocyanate capable of imparting long-term water resistance and water repellency to a substrate, and excellent in low-temperature curability and storage stability, and an aqueous composition comprising the same.

Solution to Problem

As a result of exhaustive studies to solve the above-mentioned problems, the present inventors have surprisingly found that, a blocked polyisocyanate comprising both of a blocked isocyanate group blocked with a pyrazole compound and a cationic group neutralized with an anionic compound in one molecule thereof can solve the above-mentioned problems, and this finding has led to the completion of the present invention.

When the number of blocked isocyanate groups in one molecule of a blocked polyisocyanate is large, curability is excellent. In the blocked polyisocyanate of the present invention, the introduction of a cationic group quite unexpectedly improves the curability in spite of resulting in lessening the average number of the blocked isocyanate groups.

That is, the present invention is as follows.

1. A blocked polyisocyanate, being obtained by using a polyisocyanate derived from an aliphatic and/or an alicyclic diisocyanate monomer, as a precursor, and comprising both of a blocked isocyanate group blocked with a pyrazole compound and a cationic group neutralized with an anion, in one molecule thereof.
2. The blocked polyisocyanate according to 1 described above, wherein the polyisocyanate as a precursor has a concentration of the aliphatic and/or the alicyclic diisocyanate monomer of 3% by mass or less.
3. The blocked polyisocyanate according to 1 or 2 described above, wherein the polyisocyanate as a precursor has an average number of isocyanate groups of 4.0 to 15.
4. The blocked polyisocyanate according to 1, 2 or 3 described above, wherein the aliphatic diisocyanate monomer is hexamethylene diisocyanate.
5. An aqueous composition comprising a blocked polyisocyanate according to 1, 2, 3 or 4 described above
6. A method for treating a fiber, comprising using a composition comprising a blocked polyisocyanate according to 1, 2, 3 or 4 described above.
7. A fiber treated with a composition comprising a blocked polyisocyanate according to 1, 2, 3 or 4 described above.

Advantages of the Invention

The blocked polyisocyanate and the aqueous composition comprising the same according to the present invention are excellent in storage stability and low-temperature curability, and can impart water resistance and water repellency to a substrate.

MODE FOR CARRYING OUT THE INVENTION

The present invention will be specifically described hereinafter.

The aliphatic and/or the alicyclic diisocyanate monomer usable for the present invention refers to a compound containing no benzene ring structure in the structure thereof. Preferable aliphatic diisocyanate monomers are ones having 4 to 30 carbon atoms; and preferable alicyclic diisocyanate monomers are ones having 8 to 30 carbon atoms; and examples thereof include tetramethylene-1,4-diisocyanate, pentamethylene-1,5-diisocyanate, hexamethylene diisocyanate, 2,2,4-trimethyl-hexamethylene-1,6-diisocyanate, lysine diisocyanate, isophorone diisocyanate, 1,3-bis(isocyanatomethyl)-cyclohexane and 4,4'-dicyclohexylmethane diisocyanate. These may be used singly or in combination. Above all, in order to impart flexibility to a base material, hexamethylene diisocyanate (hereinafter referred to as HDI) is preferable.

A polyisocyanate as a precursor of the blocked polyisocyanate of the present invention can be obtained from these diisocyanate monomers.

The polyisocyanate may contain, for example, a biuret bond, a urea bond, an isocyanurate bond, a uretdione bond, a urethane bond, an allophanate bond and an iminooxadiazinedione bond, and may also contain, for example, two or more bonds such as a combination of an isocyanurate bond and an allophanate bond, and a combination of an isocyanurate bond and a uretdione bond.

A polyisocyanate having a biuret bond can be obtained by reacting a so-called biuretizing agent such as water, t-butanol or urea with a diisocyanate monomer in a molar ratio of the biuretizing agent/the isocyanate group of the diisocyanate monomer of about ½ to about $\frac{1}{100}$, and thereafter removing the diisocyanate monomer. These techniques are disclosed, for example, in JP 53-106797 A, JP 55-11452 A and JP 59-95259 A.

A urea bond is formed of an isocyanate group and water or an amine group, but has a large cohesive force, and the content thereof in common polyisocyanates is low.

A polyisocyanate having an isocyanurate bond is obtained, for example, by performing a cyclic trimerization reaction using a catalyst and the like, terminating the reaction when the conversion rate becomes about 5 to about 80% by mass, and removing the unreacted diisocyanate monomer. At this time, a mono- to hexavalent alcohol compound described below can be used together as a raw material.

These techniques are described, for example, in JP 55-38380 A, JP 57-78460 A, JP 57-47321 A, JP 61-111371 A, JP 64-33115 A, JP 2-250872 A, and JP 6-312969 A.

A polyisocyanate having a urethane bond can be produced by using a polyhydric alcohol compound as a non-polymerized polyol and/or a polymerized polyol, and a diisocyanate monomer. The polyhydric alcohol compound is a polyol having been subjected to no polymerization, and the polymerized polyol is obtained by polymerization of a monomer.

The polyhydric alcohol compound includes diols, triols and tetraols. Examples of the diols include ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol and 2,2-diethyl-1,3-propanediol; examples of the triols include glycerol and trimethylolpropane; and examples of the tetraols include pentaerythritol.

The polymerized polyol includes polyester polyols, polyether polyols, acryl polyols and polyolefin polyols.

Examples of the polyester polyols include: polyester polyols obtained by the condensation reaction of a dibasic acid, singly or as a mixture thereof, selected from the group of carboxylic acids, such as succinic acid, adipic acid, sebacic acid, dimer acids, maleic anhydride, phthalic anhydride, isophthalic acid, terephthalic acid and the like, with a polyhydric alcohol, singly or as a mixture thereof, selected from the group of ethylene glycol, propylene glycol, diethylene glycol, neopentylglycol, trimethylolpropane, glycerol and the like; and polycaprolactones obtained, for example, by the ring-opening polymerization of ε-caprolactone by using a polyhydric alcohol compound.

These polyester polyols can be modified with an aromatic diisocyanate, an aliphatic or an alicyclic diisocyanate, and a polyisocyanate obtained therefrom. In this case, particularly aliphatic or alicyclic diisocyanates, and the polyisocyanates obtained therefrom are preferable from the viewpoint of weather resistance, yellowing resistance and the like.

Examples of the polyether polyols include: polyether polyols obtained by random- or block-addition of an alkylene oxide, singly or as a mixture thereof, such as ethylene oxide, propylene oxide, butylene oxide, cyclohexene oxide and styrene oxide, to a polyhydric alcohol compound, singly or as a mixture thereof, using a hydroxide of lithium, sodium, potassium or the like, a strong basic catalyst such as an alcoholate and an alkylamine, a metal porphyrin, or a composite metal cyanide complex such as a zinc hexacyanocobaltate complex; further, polyether polyols obtained by reacting a polyamine compound such as ethylene diamines with an alkylene oxide; and so-called polymer polyols obtained by polymerizing an acrylamide or the like using these polyethers as a medium.

The polyhydric alcohol compound usable here includes, in addition to the above-mentioned polyhydric alcohol compounds,
1) diglycerol, ditrimethylolpropane, pentaerythritol, dipentaerythritol, and the like;
2) sugar alcohol compounds, such as erythritol, D-threitol, L-arabinitol, ribitol, xylitol, sorbitol, mannitol, galactitol and rhamnitol;
3) monosaccharides, such as arabinose, ribose, xylose, glucose, mannose, galactose, fructose, sorbose, rhamnose, fucose and ribodesose;
4) disaccharides, such as trehalose, sucrose, maltose, cellobiose, gentiobiose, lactose and melibiose;
5) trisaccharides, such as raffinose, gentianose and melezitose; and
6) tetrasaccharides such as stacchyose.

Examples of the acryl polyols include acryl polyols obtained by polymerizing a single compound or a mixture thereof as an essential component selected from the group of acrylate esters having active hydrogen, such as 2-hydroxyethyl acrylate, 2-hydroxypropyl acrylate and 2-hydroxybutyl acrylate, an acrylic acid monoester or a methacrylic acid monoester of glycerol, and an acrylic acid monoester or a methacrylic acid monoester of trimethylolpropane, and methacrylate esters having active hydrogen, such as 2-hydroxyethyl methacrylate, 2-hydroxypropyl methacrylate, 2-hydroxybutyl methacrylate and 3-hydroxypropyl methacrylate and 4-hydroxybutyl methacrylate, in the presence of, or in the absence of, a single compound or a mixture thereof selected from the group of acrylate esters such as methyl acrylate, ethyl acrylate, isopropyl acrylate, n-butyl acrylate and 2-ethylhexyl acrylate, methacrylate esters such as methyl methacrylate, ethyl methacrylate, isopropyl methacrylate, n-butyl methacrylate, isobutyl methacrylate, n-hexyl methacrylate and lauryl methacrylate, unsaturated carboxylic acids such as acrylic acid, methacrylic acid, maleic acid and itaconic acid, unsaturated amides such as acrylamide, N-methylolacrylamide and diacetone acrylamide, and other polymerizable monomers including vinyl monomers having a hydrolysable silyl group, such as glycidyl methacrylate, styrene, vinyltoluene, vinyl acetate, acrylonitrile, dibutyl fumarate, vinyltrimethoxysilane, vinylmethyldimethoxysilane and γ-methacryloxypropylmethoxysilane.

Examples of the polyolefin polyols include polybutadienes having two or more hydroxyl groups, hydrogenated polybutadienes, polyisoprenes and hydrogenated polyisoprenes.

Isobutanol, n-butanol, 2-ethylhexanol and the like, which are monoalcohol compounds having 50 or less carbon atoms, may further be concurrently used.

The polyol and/or the polyhydric alcohol compound is reacted with the diisocyanate monomer in a molar ratio of the hydroxyl group of the polyol and/or the polyhydric alcohol compound to the isocyanate group of the diisocyanate monomer of about ½-about 1/100, followed by removing the diisocyanate monomer.

The polyisocyanate having an allophanate bond can be produced from the polyol and/or the polyhydric alcohol compound, and the diisocyanate monomer. The allophanate bond is a bond in which an isocyanate group is bonded to a urethane bond, and which is formed by use of a catalyst, heat and the like. An allophanate bond and a urethane bond may coexist.

The polyisocyanate having an iminooxadiazinedione bond can be obtained, for example, by a reaction using a catalyst. Techniques regarding this are described, for example, in JP 2004-534870 A.

The diisocyanate monomer concentration in the obtained polyisocyanate is 3% by mass or less, and preferably 1% by mass or less. If the concentration exceeds 3% by mass, the curability decreases in some cases.

These polyisocyanates may be used as a mixture of two or more.

The viscosity at 25° C. of a polyisocyanate used in the present invention is 50 to 2,000,000 mPa·s, and preferably 3,000 to 50,000 mPa·s. If the viscosity is 50 mPa·s or more, the statistical average number of the isocyanate group which one polyisocyanate molecule has (hereinafter referred to as an average number of the isocyanate group) does not consequently decrease; and if the viscosity is 2,000,000 mPa·s or less, the increase in the viscosity of the obtained blocked polyisocyanate, and the deterioration in the appearance of a coated film using the blocked polyisocyanate can be prevented.

The average number of the isocyanate group in a polyisocyanate is 3.0 or more and 20 or less, preferably 3.5 or more and 15 or less, more preferably 4.0 or more and 15 or less, and still more preferably 4.5 or more and 15 or less. If the average number is 3.0 or more, a risk of decreasing the curability of the finally obtained aqueous blocked polyisocyanate can be prevented; and if the average number is 20 or less, a risk of decreasing the crosslinkability after partial curing of the obtained blocked polyisocyanate can be prevented, which are preferable.

At least a part of the isocyanate groups in the polyisocyanate thus obtained is reacted with a pyrazole compound to block the isocyanate groups. The isocyanate group thus blocked is referred to as a blocked isocyanate group; and a compound to block an isocyanate group is referred to as a blocking agent.

The pyrazole compound usable in the present invention is a compound represented by the following formula (I):

[Formula 1]

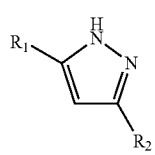

According to the situation, another blocking agent may be used concurrently. The blocking agents concurrently usable are listed as follows.

(1) Alcohols, such as methanol, ethanol, 2-propanol, n-butanol, sec-butanol, 2-ethyl-1-hexanol, 2-methoxyethanol, 2-ethoxyethanol, and 2-butoxyethanol.

(2) Alkylphenols: mono- and dialkylphenols having an alkyl group having 4 or more carbon atoms as a substituent; and examples thereof include monoalkylphenols such as n-propylphenol, isopropylphenol, n-butylphenol, sec-butylphenol, t-butylphenol, n-hexylphenol, 2-ethylhexylphenol, n-octylphenol and n-nonylphenol, and dialkylphenols such as di-n-propylphenol, diisopropylphenol, isopropyl cresol, di-n-butylphenol, di-t-butylphenol, di-sec-butylphenol, di-n-octylphenol, di-2-ethylhexylphenol and di-n-nonylphenol.

(3) Phenols: phenol, cresol, ethylphenol, styrenated phenol, hydroxybenzoate esters and the like.

(4) Active methylenes: dimethyl malonate, diethyl malonate, methyl acetoacetate, ethyl acetoacetate, acetylacetone and the like.

(5) Mercaptans: butylmercaptans, dodecylmercaptan and the like.

(6) Acid amides: acetanilide, acetic acid amide, ε-caprolactam, δ-valerolactam, γ-butyrolactam and the like.

(7) Acid imides: succinimide, maleimide and the like.

(8) Imidazoles: imidazole, 2-methylimidazole and the like.

(9) Ureas: urea, thiourea, ethylene urea and the like.

(10) Oximes: formaldoxime, acetaldoxime, acetoxime, methyl ethyl ketoxime, cyclohexanone oxime, and the like.

(11) Amines: diphenylamine, aniline, carbazole, di-n-propylamine, diisopropylamine, isopropylethylamine, and the like.

The blocked polyisocyanate of the present invention concurrently has a cationic group in one molecule thereof.

There are methods for introducing a cationic group, such as a method in which a compound concurrently having a cationic group and active hydrogen to react with an isocyanate group is utilized, and a method in which a functional group such as a glycidyl group is introduced to a polyisocyanate in advance, and thereafter, a specific compound such as a sulfide or phosphine is reacted with the functional group; but the former method is easily carried out.

Examples of the active hydrogen to react with an isocyanate group include a hydroxyl group, a thiol group and an amino group.

Preferable examples of the compound concurrently having a cationic group and active hydrogen to react with an isocyanate group include 2-(dimethylamino)ethanol, 2-(diethylamino)ethanol, methyldiethanolamine, ethyldiethanolamine, butyldiethanolamine, 2-[2-(dimethylamino)ethoxy]ethanol and N,N,N'-trimethyl-2-hydroxyethylpropylenediamine, and more preferable examples thereof include an aminoalcohol having one hydroxyl group in the molecule.

The introduction of a cationic group can be carried out whichever before or after the blocking of an isocyanate group with a pyrazole compound. The introduction of a cationic group and the blocking reaction of an isocyanate group can be carried out in the presence of a solvent. The solvent in this case preferably contains no active hydrogen.

As required, a nonionic hydrophilic group such as a polyethylene glycol monoalkyl ether can be used concurrently.

The equivalent ratio of a blocked isocyanate group which is an isocyanate group blocked with a pyrazole compound to a cationic group is 50:50-95:5, and preferably 60:40-90:10. If the blocked isocyanate group is not less than this ratio, the curability does not decrease; and if the blocked isocyanate group is not more than this ratio, as a result, the cationic group does not decrease and the water dispersibility does not decrease either.

At least a part of cationic groups in the blocked polyisocyanate of the present invention is neutralized with an anion.

Examples of the anion include a carboxyl group, a sulfonate group, a phosphate group, a halogen group and a sulfate group. Examples of compounds having a carboxyl group include formic acid, acetic acid, propionic acid, butyric acid and lactic acid; examples of compounds having a sulfonate group include ethane sulfonate; examples of compounds having a phosphate group include phosphoric acid and acidic phosphate esters; examples of compounds having a halogen group include hydrochloric acid; and examples of compounds having a sulfate group include sulfuric acid. Compounds having a carboxyl group are preferable, and more preferable are acetic acid, propionic acid and butyric acid.

An introduced tertiary amino group may be quaternized with dimethyl sulfate, diethyl sulfate or the like.

The equivalent ratio of a cationic group introduced to a blocked polyisocyanate to an anionic group in the case of the neutralization is 1:0.5-1:3, and preferably 1:1-1:1.5. Water is added to a blocked polyisocyanate having a cationic group thus neutralized with an anion and a blocked isocyanate group blocked with a pyrazole compound, thereby resulting in the aqueous composition of the present invention. The blocked polyisocyanate can be easily dispersed and dissolved in water. The concentration of the blocked polyisocyanate in the aqueous composition can be suitably decided, but the concentration is 10 to 40% by mass in many cases.

The finding is surprising that if the average number of the isocyanate groups in a precursor polyisocyanate is high, the blocked polyisocyanate can be dispersed and dissolved more in water.

The finding is also surprising that the aqueous composition of the blocked polyisocyanate thus obtained is markedly superior in the storage stability to a blocked polyisocyanate having an anionic group as an ionic hydrophilic group.

The blocked polyisocyanate of the present invention can react with active hydrogen of the polyvalent active hydrogen compound to form a crosslinked urethane resin.

Examples of the polyvalent active hydrogen compound to include polyols, polyamines and polythiols; and polyols are used in many cases. These polyols preferably have a cationic group in their molecules.

In the case where the polyvalent active hydrogen compound has an anionic group, in some cases, the compound can be hardly dispersed or dissolved in water with a cationic blocked polyisocyanate. Examples of such a polyol include epoxy polyols, acryl polyols, polyester polyols, polyether polyols and fluorinated polyols.

If the medium is water, these can be in the form of solution, dispersion, emulsion or the like.

The epoxy polyol can be obtained by reacting an epoxy group of an epoxy resin, for example, with an amine group of a compound having both a hydroxyl group and an amine group to introduce a hydroxyl group and a cationic group to the epoxy group.

Preferable polyols are epoxy polyols, fluorinated polyols, and acryl polyols. It is also effective that the blocked polyisocyanate of the present invention is added to a fluorine-containing water- and oil-repellant agent containing no perfluorooctanoic acid and/or no analogous compound thereof. Such use can sustain the water and oil repellency.

The hydroxyl value of these polyols is selected from 10 to 400 mg KOH/g; and the amine value from 0 to 400 mg KOH/g. Particularly the amine value in the case of using the polyol for an aqueous urethane composition is selected from 30 to 400 mg KOH/g according to need.

The equivalent ratio of (the isocyanate group of a blocked polyisocyanate) to (the active hydrogen group of a polyvalent active hydrogen compound) is 0.2-1.5, and is suitably selected according to required physical properties.

The blocked polyisocyanate of the present invention can be used without using the polyvalent active hydrogen compound. There are effects such that a resin concurrently used is adhered to a substrate and reacts with active hydrogen present in the substrate to impart elasticity to the substrate, and other effects.

A cationic blocked polyisocyanate neutralized with an anionic compound, thus obtained, and an aqueous composition containing the same are useful, for example, as primers or as top and intermediate coatings for inorganic and organic substrates such as metals, plastics and fibers (plant fibers, animal fibers, carbon fibers and the like), and also as adhesives, pressure-sensitive adhesives, elastomers, foams, surface treating agents and the like.

EXAMPLES

Hereinafter, the present invention will be described in more detail by way of Examples, but the scope of the present invention is not limited to the following Examples. "Parts" are all "parts by mass".

(Measurement of Number-Average Molecular Weight)

The number-average molecular weight is a number-average molecular weight in terms of polystyrene by gel permeation chromatography (hereinafter referred to as GPC) using the following apparatus:

| Apparatus: | Tosoh Corp. HLC-802A |
|---|---|
| Columns: | Tosoh Corp. G1000HXL × 1 column |
| | G2000HXL × 1 column |
| | G3000HXL × 1 column |
| Detection method: | differential refractometer |

(Concentration of Unreacted Diisocyanate Monomer)

The concentration of the peak at a molecular weight corresponding to unreacted diisocyanate (for example, 168 for HDI) acquired in the GPC measurement was represented by area % thereof.

(Measurement of Viscosity)

The viscosity was measured using an E-type viscometer (made by Tokyo Keiki Inc., VISCONIC type ED) at 25° C.

(Water Dispersibility)

The appearance of a blocked polyisocyanate aqueous composition was visually observed 24 hours after the production of the composition. The state in which there was no change in the solution state between right after the production and 24 hours thereafter and there was no deposit, was represented as ○ (good); and the state in which there was some change in the solution state such as the presence of deposit, was represented as x (bad).

(Storage Stability)

A blocked polyisocyanate aqueous solution was preserved at 50° C. for 3 weeks. The state of no deposit was represented as ○ (good); and the state in which there was some change in the solution state such as the presence of deposit was represented as x (bad).

(Curability)

A cured coated film was immersed in methanol at 20° C. for 24 hours, and thereafter, a weight of undissolved portions of the film was divided by a weight of the film before the immersion to acquire a curability in %; and the case of less than 50% was represented as × (bad); the case of 50% or more and less than 70%, as ○ (good); and the case of 70% or more, as ⊚ (excellent).

Production Example 1

Production of Polyisocyanate

The interior of a four-necked flask provided with a stirrer, a thermometer, a reflux cooling tube, a nitrogen blowing tube and a dropping funnel was made a nitrogen atmosphere; and 1,000 parts of HDI was charged into the flask, and the temperature in the reactor under stirring was held at 70° C.

Tetramethylammonium capriate, an isocyanuration catalyst, was added to the reactor, to which phosphoric acid was added at the time when the yield became 40% (3 hours after the addition of the catalyst) to terminate the reaction.

After the reaction solution was filtrated, unreacted EMI was removed using a thin film evaporator.

The viscosity at 25° C. of the obtained polyisocyanate was 2,800 mPa·s; the content of the isocyanate group was 21.7% by mass; the concentration of the diisocyanate monomer was 0.2% by mass; the number-average molecular weight was 660; and the isocyanate functional average number was 3.4.

The infrared spectrum measurement showed an absorption of the isocyanurate group.

Production Example 2

Production of Polyisocyanate

The interior of a four-necked flask provided with a stirrer, a thermometer, a reflux cooling tube, a nitrogen blowing tube and a dropping funnel was made a nitrogen atmosphere; and 600 parts of HDI and 30 parts of "Placcel 303" (trade name by Daicel Chemical Industries, Ltd., molecular weight: 300), a polycaprolactone-based polyester polyol as a trihydric alcohol, were charged into the flask, and the temperature in the reactor under stirring was held at 90° C. for 1 hour to carry out the urethanation reaction.

Thereafter, the temperature in the reactor was held at 60° C.; and tetramethylammonium capriate, an isocyanuration catalyst, was added to the reactor, to which phosphoric acid was added at the time when the yield became 54% to terminate the reaction.

After the reaction solution was filtrated, unreacted HDI was removed using a thin film evaporator.

The viscosity at 25° C. of the obtained polyisocyanate was 9,500 mPa·s; the content of the isocyanate group was 19.2% by mass; the concentration of HDI was 0.2% by mass; the number-average molecular weight was 1,100; and the isocyanate functional average number was 5.1.

Production Example 3

Production of Polyisocyanate

Six hundreds (600) parts of HDI and 134 parts of a polyether polyol (trade name: "HP-1030", by Adeka Corp.) as a pentahydric alcohol were charged into the same apparatus as in Production Example 1 under a nitrogen atmosphere, and the temperature in the reactor under stirring was held at 160° C. for 5 hours.

After the reaction solution was filtrated, unreacted HDI was removed using a thin film evaporator.

The viscosity at 25° C. of the obtained polyisocyanate was 31,000 mPa·s; the content of the isocyanate group was 12.0% by mass; the concentration of HDI was 0.2% by mass; the number-average molecular weight was 2,520; and the isocyanate functional average number was 7.2.

Production Example 4

Production of Aqueous Epoxy Polyol

One hundred (100) parts of a bisphenol A epoxy resin (trade name: AER6071, by Asahi Kasei E-Materials Corp., epoxy equivalent: 460) and 81.8 parts of propylene glycol monomethyl ether acetate (hereinafter referred to as PMA) were charged into the same apparatus as in Production Example 1, and the temperature in the reactor was set at 90° C.; thereafter, 22.8 parts of diethanolamine was dropped over 20 min. The temperature in the reactor after the dropping was 100° C. After the completion of the dropping, the reaction temperature was raised to 120° C. and held for 2 hours. After the temperature holding, the extinction of peaks originated from the epoxy ring to be detected at 910 to 950 cm$^{-1}$ by IR was confirmed. Further, 13.0 parts of acetic acid (equivalent neutralization) and 235.1 parts of pure water were added to obtain an epoxy polyol aqueous solution having a resin solid content of 30%, a hydroxyl value of the resin content of 298 mg KOH/g, and an amine value of 99 mg KOH/g.

Production Example 5

Production of Solvent-Based Epoxy Polyol

A solvent-based epoxy polyol was produced in the same manner as in Production Example 4, except for not using acetic acid and pure water. An epoxy polyol having a resin solid content of 60% was obtained.

Example 1

One hundred (100) parts of the polyisocyanate obtained in Production Example 1 and 10 parts of PMA (in 10% by mass based on the polyisocyanate) were mixed using the same apparatus as in Production Example 1 under a nitrogen atmosphere; the temperature was held at 60° C.; thereafter, 9.2 parts of 2-(dimethylamino)ethanol, which had one cationic group and one hydroxyl group, was added.

After 30 min, 41.7 parts of 3,5-dimethylpyrazole was added. The infrared absorption spectrum of the reaction solution was measured, and the extinction of the absorption of the isocyanate group was confirmed.

Further, 7.4 g of acetic acid was added and mixed. Thereafter, ion exchange water was added to obtain a blocked polyisocyanate aqueous composition having a concentration of the resin content of 30% by mass.

The equivalent ratio of the blocked isocyanate group blocked with 3,5-dimethylpyrazole to diethylethanolamine was 80:20. The evaluation results are shown in Table 1.

Examples 2 to 8 and Comparative Example 1

Reactions were carried out in the same manner as in Example 1, except for using conditions described in Table 1. The evaluation results are shown in Table 1.

Comparative Example 2

In place of the cationic compound, 90.2 parts of methoxypolyethylene glycol (trade name: "Uniox M550", by NOF Corp., molecular weight: 550) was used as a nonionic compound. The procedure was carried out in the same manner as in Example 1, except for not carrying out the acid neutralization. The results are shown in Table 1.

Comparative Example 3

The procedure was carried out in the same manner as in Example 1, except that 35.1 parts of dimethyloipropionic acid as an anionic compound in place of the cationic compound, and 2-(dimethylamino)ethanol were used. The results are shown in Table 1.

Examples 9 to 17 and Comparative Examples 4 to 7

The cationic blocked polyisocyanate neutralized with the anionic compound in Example 1 and the epoxy polyol in Production Example 4 were mixed in 3:7 (resin content mass ratio), and applied onto a polypropylene plate by an applicator so that the resin film thickness became 40 p.m. After 30-min room temperature setting, the applied material was held in an oven at 110° C. for 30 min and cured. The results are shown in Table 2.

Example 18

Evaluation as Fiber Treating Agent

One hundred (100) parts of Asahi Guard AG-E061 (made by Asahi Glass Co., Ltd., solid content: 20%) as a fiber treating agent (water- and oil-repellant agent), and 20 parts of the blocked polyisocyanate aqueous composition in Example 1 were mixed; and water was added to dilute the mixture so that the resin content concentration became 1.5% by mass. Thus, a processing liquid was made. A fabric (cotton) was immersed in the processing liquid, and squeezed by a roller so that the wet pickup became 50%. The fabric was dried at 110° C. for 90 sec and thereafter further at 170° C. for 60 sec to make a test fabric for evaluation. The evaluation results are shown in Table 3.

Example 19 and Comparative Examples 8 and 9

The procedures were carried out in the same manner as in Example 18, except for using conditions shown in Table 3. The results are shown in Table 3.
(Evaluation of Water and Oil Repellency)
Twenty (20) microliters of isopropyl alcohol/water (mass ratio) was dropped onto the test fabric, and the state of liquid droplet was observed to evaluate the water and oil repellency. The evaluation is as follows:

3 (good): The liquid droplet is spherical.
2 (somewhat good): The liquid droplet is not spherical but does not infiltrate into the test fabric.
1 (bad): The liquid droplet infiltrates into the test fabric.
(Evaluation of Laundering Resistance)
The test fabric was washed using an aqueous solution of a synthetic detergent concentration of 0.1% by a household washing machine, and dried. This operation was repeated 15 times to evaluate the water and oil repellency.

Example 20

Curability Using Solvent-Based Material

The procedure was carried out in the same manner as in Example 1, except for not adding water and adding PMA for dilution so that the resin solid content became 70%. Then, the procedure was carried out in the same manner as in Example 9, except for mixing the obtained blocked polyisocyanate composition and the epoxy polyol obtained in Production Example 5 in 3:7 (resin content mass ratio). The results are shown in Table 4.

Comparative Production Example 1

The procedure was carried out in the same manner as in Example 1, except that 2-(dimethylamino)ethanol and acetic acid were not used, all of the isocyanate groups in the polyisocyanate were blocked with 3,5-dimethylpyrazole, water was not added, and PMA was used for dilution so that the resin solid content became 70%.

Comparative Example 11

The procedure was carried out in the same manner as in Example 20, except for using conditions shown in Table 4.

INDUSTRIAL APPLICABILITY

The blocked polyisocyanate according to the present invention having a blocked isocyanate group blocked with pyrazole and a cationic group neutralized with an anionic compound in one molecule thereof can suitably be utilized, for example, as primers or top and intermediate coatings for inorganic and organic substrates such as metals, plastics and fibers (plant fibers, animal fibers, carbon fibers and the like), and in the fields of adhesives, pressure-sensitive adhesives, elastomers, foams, surface treating agents and the like.

TABLE 1

| Examples | Polyisocyanate | Blocking agent | Cationic compound | Acid for neutralizing agent | Blocked isocyanate group:cationic group (equivalent) | Water dispersibility | Storage stability |
|---|---|---|---|---|---|---|---|
| Example 1 | Production Example 1 100 parts | DMP 41.7 parts | DMAE 9.2 parts | acetic acid 7.4 parts | 80:20 | ○ | ○ |
| Example 2 | Production Example 2 100 parts | DMP 35.1 parts | DMAE 7.8 parts | acetic acid 6.3 parts | 80:20 | ◎ | ○ |
| Example 3 | Production Example 3 100 parts | DMP 17.2 parts | DMAE 3.8 parts | acetic acid 3.1 parts | 80:20 | ◎ | ○ |
| Example 4 | Production Example 2 100 parts | DMP 37.3 parts | DMAE 5.8 parts | acetic acid 4.7 parts | 85:15 | ◎ | ○ |
| Example 5 | Production Example 2 100 parts | DMP 41.7 parts | DMAE 13.6 parts | acetic acid 11.0 parts | 65:35 | ◎ | ○ |
| Example 6 | Production Example 2 100 parts | DMP 28.6 parts | DMAE 14.5 parts | acetic acid 7.8 parts | 75:25 | ◎ | ○ |
| Example 7 | Production Example 2 100 parts | DMP 32.9 parts | DMAE 17.4 parts | acetic acid 15.7 parts | 75:25 | ◎ | ○ |

TABLE 1-continued

| Examples | Polyisocyanate | Blocking agent | Cationic compound | Acid for neutralizing agent | Blocked isocyanate group:cationic group (equivalent) | Water dispersibility | Storage stability |
|---|---|---|---|---|---|---|---|
| Example 8 | Production Example 2 100 parts | DMP 37.3 parts | DMAE 5.8 parts | butyric acid 6.9 parts | 85:25 | ◉ | ○ |
| Comparative Example 1 | Production Example 2 100 parts | MEKO 31.8 parts | DMAE 7.8 parts | butyric acid 6.3 parts | 80:20 | ◉ | ○ |
| Comparative Example 2 | Production Example 2 100 parts | DMP 30.7 parts | MPEG (nonion) 90.2 parts | — | 70:30 | ○ | ○ |
| Comparative Example 3 | Production Example 2 100 parts | DMP 35.1 parts | DMPA (anion) 35.1 parts | DMAE (base) 4.7 parts | 80:20 | ◉ | X |

*DMP: 3,5-dimethylpyrazole, MEKO: methyl ethyl ketoxime
*DMAE: 2-(dimethylamino)ethanol, DAEE: 2-[2-(dimethylamino)ethoxy]ethanol, TMAEEA: N,N,N'-trimethyl-2-hydroxyethylpropylenediamine, MPEG: methoxypolyethylene glycol
*DMPA: dimethylolpropionic acid

TABLE 2

|  | Example 9 | Example 10 | Example 11 | Example 12 | Example 13 | Example 14 | Example 15 | Example 16 | Example 17 |
|---|---|---|---|---|---|---|---|---|---|
| Aqueous blocked polyisocyanate | Example 1 | Example 2 | Example 3 | Example 4 | Example 5 | Example 6 | Example 7 | Example 8 | Example 9 |
| Curability | ○ | ◉ | ◉ | ◉ | ◉ | ◉ | ◉ | ◉ | ◉ |

|  | Comparative Example 5 | Comparative Example 6 | Comparative Example 7 |
|---|---|---|---|
| Aqueous blocked polyisocyanate | Comparative Example 1 | Comparative Example 2 | Comparative Example 3 |
| Curability | X | X | Not evaluated |

TABLE 3

|  | Aqueous blocked polyisocyanate | Water and oil Repellency | |
|---|---|---|---|
|  |  | Before laundering | After 15-times launderings |
| Example 18 | Example 2 | 3 | 3 |
| Example 19 | Example 3 | 3 | 3 |
| Comparative Example 8 | Not used | 3 | 2 |
| Comparative Example 9 | Comparative Example 2 | 3 | 2 |

TABLE 4

|  |  | Blocked polyisocyanate | |
|---|---|---|---|
|  | Polyol | Kind | Number of blocked isocyanate functional groups | Curability |
| Example 20 | Production Example 5 | Described in Example 20 | 2.7 | ○ |
| Comparative Example 10 | Production Example 5 | Comparative Production Example 1 | 3.4 | X |

The invention claimed is:

1. A blocked polyisocyanate, being obtained by using a polyisocyanate derived from an aliphatic and/or an alicyclic diisocyanate monomer, as a precursor, and comprising both of a blocked isocyanate group blocked with a pyrazole compound and a cationic group derived from 2-(dimethylamino)ethanol, 2-(diethylamino)ethanol, methyldiethanolamine, ethyldiethanolamine, butyldiethanolamine, 2-[2-(dimethylamino)ethoxy]ethanol, or N,N,N'-trimethyl-2-hydroxyethylpropylenediamine, which is neutralized with at least one anion selected from the group consisting of a carboxyl group, a sulfonate group, a phosphate group, a halogen group, and a sulfate group, in one molecule thereof, wherein the polyisocyanate as a precursor has an average number of isocyanate groups of 5.1 to 15.

2. The blocked polyisocyanate according to claim 1, wherein the polyisocyanate as a precursor has a concentration of the aliphatic and/or the alicyclic diisocyanate monomer of 3% by mass or less.

3. The blocked polyisocyanate according to claim 1, wherein the aliphatic diisocyanate monomer is hexamethylene diisocyanate.

4. An aqueous composition comprising a blocked polyisocyanate according to claim 1.

5. A method for treating a fiber, comprising treating a fiber with a composition comprising a blocked polyisocyanate according to claim 1.

6. A fiber treated with a composition comprising a blocked polyisocyanate according to claim 1.

7. The blocked polyisocyanate according to claim 2, wherein the aliphatic diisocyanate monomer is hexamethylene diisocyanate.

8. An aqueous composition comprising a blocked polyisocyanate according to claim 2.

9. An aqueous composition comprising a blocked polyisocyanate according to claim 3.

10. A method for treating a fiber, comprising treating a fiber with a composition comprising a blocked polyisocyanate according to claim 2.

11. A method for treating a fiber, comprising treating a fiber with a composition comprising a blocked polyisocyanate according to claim 3.

12. A fiber treated with a composition comprising a blocked polyisocyanate according to claim 2.

13. A fiber treated with a composition comprising a blocked polyisocyanate according to claim 3.

* * * * *